Jan. 16, 1951 M. D. BUIVID 2,538,082
HELICOPTER CONTROL
Original Filed March 31, 1943 2 Sheets-Sheet 1
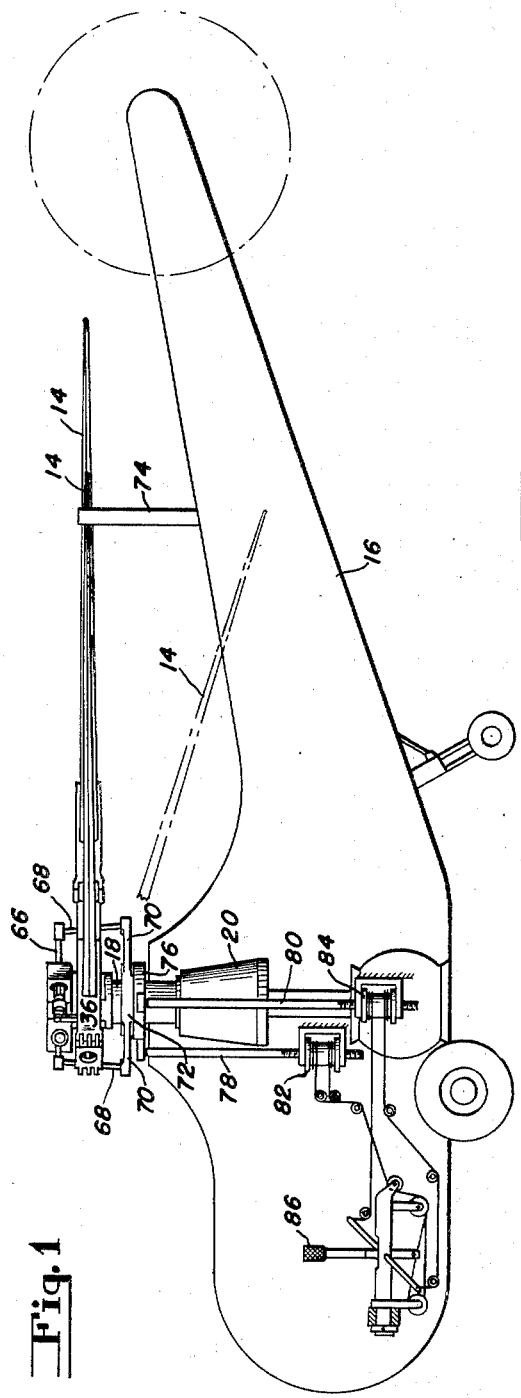
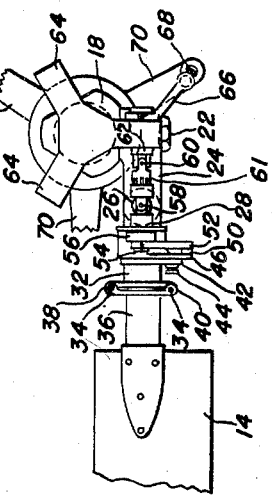
INVENTOR
MICHEL D. BUIVID
BY M. B. Tasker
ATTORNEY Jan. 16, 1951　　　M. D. BUIVID　　　2,538,082
HELICOPTER CONTROL
Original Filed March 31, 1943　　　2 Sheets-Sheet 2
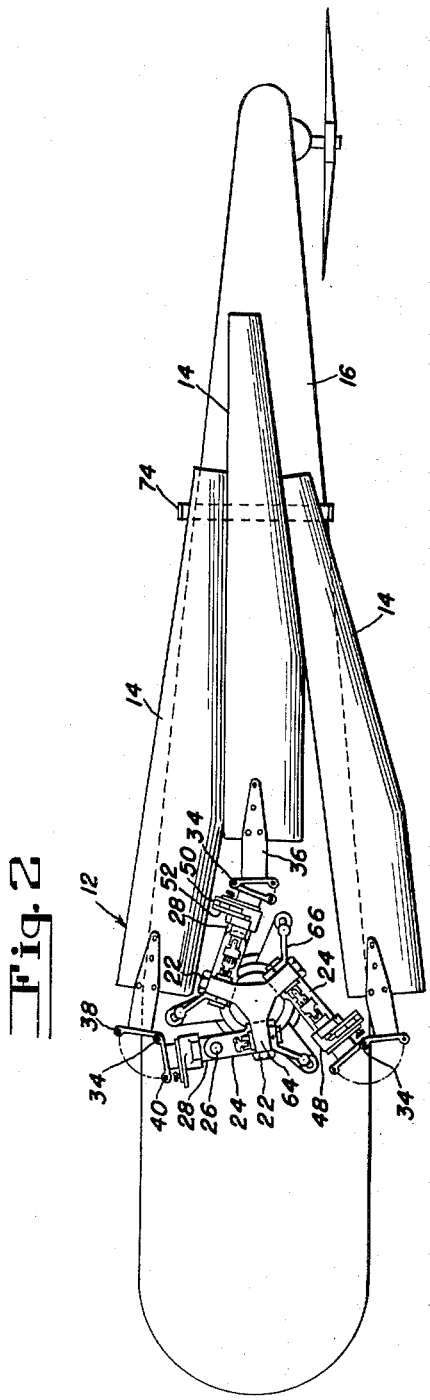
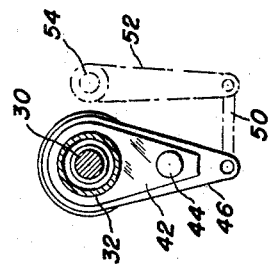
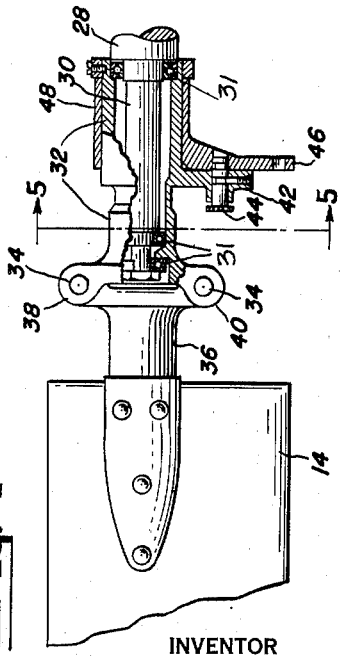
INVENTOR
MICHEL D. BUIVID
BY *M. B. Tasker*
ATTORNEY Patented Jan. 16, 1951

2,538,082

UNITED STATES PATENT OFFICE 2,538,082

HELICOPTER CONTROL

Michel D. Buivid, Milford, Conn., assignor to United Aircraft Corporation, East Hartford, Conn., a corporation of Delaware Original application March 31, 1943, Serial No. 481,254, now Patent No. 2,405,777, dated August 13, 1946. Divided and this application February 12, 1946, Serial No. 647,031

4 Claims. (Cl. 170—160.25)

1

This invention relates to improved controls for helicopters, or the like, and is a division of my application Ser. No. 481,254, filed March 31, 1943, for Foldable Rotors, which issued as Patent No. 2,405,777, August 13, 1946.

More particularly, this invention provides controls for rotary wing aircraft in which the operating connections between the body of the craft and the rotor blades are arranged adjacent the blade connections in an improved manner to inhibit aberrations in control of the blades due to aerodynamic forces acting thereon causing movement of the blades in flight, to thus render the controls precise under all conditions in flight.

In accordance with the above, an object of this invention is to provide improved controls for helicopters, or the like.

Other objects and advantages lie in the details of construction and arrangement of parts and will be apparent from the following specification, and claims, and from the accompanying drawings which illustrate what is now considered to be the preferred embodiment of the invention.

Fig. 1 is a side elevation of a helicopter with the blades folded back and one of the blades partly folded back partially shown in dot and dash lines.

Fig. 2 is a plan view of the helicopter with the blades folded.

Fig. 3 is a plan view on a larger scale showing the pitch changing mechanism of one of the rotor blades.

Fig. 4 is a fragmentary plan view on an even larger scale of a portion of the pitch changing mechanism and the mechanism permitting the folding of the blade.

Fig. 5 is a sectional view substantially along the line 5—5 of Fig. 4.

The rotary wing aircraft illustrated as a helicopter has a power-driven sustaining rotor, generally indicated at 12, having several individual blades 14 (Fig. 2). Blades 14 are carried by the upper end of a shaft 18 journaled in a head 20 in the fuselage 16. This shaft, in the plane of the blade roots, has three symmetrically arranged flat vertical surfaces from which three horizontal pivot pins 22 project each supporting a link 24. The outer end of each link 24 has a vertical pin 26 pivotally supporting a connector 28. A pin 30 extending from connector 28 fits upon thrust and guide bearings 31 within a rotatable sleeve or bracket 32 connected by pins 34 to a mounting bracket 36 on the inner end of blade 14. Means, not shown for purposes of clearness of illustration, such as supporting wires

2 or stops may be used to limit the extent of movement of the blade about pin 22 and means such as shock absorbers may be used to limit the extent of movement of the blade about the drag hinge pin 26.

Brackets 32 and 36 are connected by a hinge joint comprising interengaging hinge lugs 38 and 40 which receive the vertical pins 34. Thus, upon removal of either pin 34, the blade is free to hinge about the axis of the other pin for movement either in the direction of blade rotation or in the opposite direction. With each blade similarly mounted, it is possible to fold the blades into the position of Fig. 2 from whatever position they come to rest.

The pitch of the blades is progressively changed by movement about the pin 30 during each rotation of the blades to control the attitude of the aircraft and the direction and rate of flight. To this end, bracket 32 has a projecting arm 42 connected by a removable pin 44 to an arm 46. Arm 46 has a hub 48 mounted to turn on bracket 32 and is connected by a link 50 to an arm 52 (Fig. 5). Arm 52 is mounted on the end of shaft 54, Fig. 3, which is journaled in bearing 56 on connector 28. Shaft 54 is connected by universal joints 58 and 60 and spline 61 to a short shaft 62 turnable in a bearing 64 on the upper end of rotor shaft 18, and from Fig. 3 it will be noted that universal joint 58 lies directly over drag hinge 26. Shaft 62 has a projecting arm 66 connected by a link 68 to an arm 70 extending from a control plate 72, Fig. 1. This plate is part of the azimuth plate, the angularity of which, with respect to shaft 18, controls the extent of the pitch adjustment of the individual blades and the point in each revolution at which the pitch change begins.

The upper plate 72 of the azimuth plate is supported on gimbals upon the drive shaft and rotates with the rotor and the lower plate 76 is restrained against rotation. Pitch adjusting rods 78 and 80 are movable vertically by, and connect plate 76 with, adjusting nuts 82 and 84 which are controlled by movements of control stick 86; cables being illustrated as one means of connecting the stick with the nuts. As this mechanism is irreversible it will be apparent that strains placed upon the pitch adjusting mechanism by a blade allowed to droop to a position such as indicated by the dot and dash lines in Fig. 1 could be of great magnitude. A pitch changing mechanism strong enough to support a blade without allowing it to droop would have to be of excessive weight and strength.

Means, not shown, for purpose of clearness of illustration, for simultaneously changing the pitch of all the blades, such as means for simultaneously vertically moving the shaft bearings 64 for the several blades, may be provided, and other types of pitch adjusting mechanism may, of course, be used, such for instance as the type shown and described in United States Patents 2,402,349 and 2,415,148, issued June 18, 1946, and February 4, 1947, respectively. Even where reversible pitch changing mechanism is used, the vertical movements of the blade tips during the folding operation may exceed the limits of travel of the pitch changing mechanism, and thus strain the pitch changing mechanism.

When any one of the blades is to be folded, one of the pins 34 is removed and the blade is then swung about the axis of the other pin into the position of Fig. 2 where the end of the blade is supported by a bracket 74. As indicated above, during the folding of the blade, failure to support the end of the blade may put an undesirable strain on the pitch controlling structure. To avoid this, pin 44 is withdrawn disconnecting the blade and the hinge joint from the pitch control mechanism so that bracket 32 and blade 14 are free to turn with respect to arm 46. Thus, even if a blade is allowed to reach the slanting position of blade 14, Fig. 1, no strain is put on the pitch control structure since the bracket 32 turns within hub 48.

The same arrangement of parts permits folding of the blade when the rotor comes to rest with any one of the blades set at a high pitch. By disengaging pin 44, the outer end of the blade is free to be moved vertically when the blade reaches the folding position, and no strain is placed on the control structure by resting the end of the blade on bracket 74. This bracket may be removable to avoid interference with the blades in flight.

It is to be understood that the invention is not limited to the specific embodiment herein illustrated and described, but may be used in other ways without departure from its spirit as defined by the following claims.

I claim:

1. In combination with a rotor blade, a rotor axle, a hub mounted on said axle, a first pivotal connection adjacent the hub for guiding the blade in its coning angle changes, a second pivotal connection between said first connection and said blade for guiding the blade in its oscillations in the plane of rotation of said blade and a third pivotal connection between the second pivotal connection and said blade about which said blade is movable to effect changes in pitch of the latter, means for changing the pitch of said blade comprising a shaft connected with said blade for changing the pitch thereof by rotation of said shaft, said shaft having its axis lying substantially in the vertical plane containing the feathering axis of said blade, a bearing for one end of said shaft mounted on said third connection, a bearing for the other end of said shaft carried by said hub, and means also carried by said axle for rotating said shaft, said shaft including universal joints and a sliding connection between said bearings whereby said blade may change its coning angle and oscillate in the plane of rotation of said blade without affecting the pitch setting of the latter.

2. In combination with a rotor hub supported on a rotor shaft and carrying, upon a hinged blade support, a rotor blade free to change its coning angle and to oscillate in the plane of blade rotation; means for changing the pitch of said blade independently of the position thereof due to coning angle changes and oscillations comprising, a rocker shaft adjacent said support and having an axis substantially lying in a vertical plane containing the feathering axis of said blade, said shaft having a bearing at one end in said blade support and at its other end in said hub, control means for rocking said rocker shaft, and means connecting said rocker shaft, said control means and said blade, whereby movement of said control means can feather said blade.

3. The structure set forth in claim 2, and in addition, a sliding joint in said rocker shaft.

4. The structure set forth in claim 2, and tiltable means in said control means to control the feathering cyclically.

MICHEL D. BUIVID.

REFERENCES CITED

The following references are of record in the file of this patent:

UNITED STATES PATENTS

| Number | Name | Date |
|---|---|---|
| 1,728,315 | Viale | Sept. 17, 1929 |
| 1,938,091 | Wick | Dec. 5, 1933 |
| 1,986,709 | Breguet | Jan. 1, 1935 |
| 1,994,488 | Sikorsky | Mar. 19, 1935 |
| 2,415,148 | Sikorsky | Feb. 4, 1946 |